(12) United States Patent
Shibao (10) Patent No.: US 8,982,385 B2
(45) Date of Patent: Mar. 17, 2015

(54) IMAGE READING APPARATUS HAVING TRANSMISSION FUNCTION AND CONTROL METHOD THEREFOR

(75) Inventor: Koki Shibao, Yokohama (JP)

(73) Assignee: Canon Kabushiki Kaisha (JP)

( * ) Notice: Subject to any disclaimer, the term of this patent is extended or adjusted under 35 U.S.C. 154(b) by 32 days.

(21) Appl. No.: 13/334,686

(22) Filed: Dec. 22, 2011

(65) Prior Publication Data

US 2012/0162712 A1   Jun. 28, 2012

(30) Foreign Application Priority Data

Dec. 28, 2010   (JP) ................................. 2010-292286

(51) Int. Cl.
G06F 3/12       (2006.01)
H04N 1/00       (2006.01)
H04N 1/32       (2006.01)
H04N 1/327      (2006.01)
G06K 15/00      (2006.01)

(52) U.S. Cl.
CPC ....... *H04N 1/00217* (2013.01); *H04N 1/00798* (2013.01); *H04N 1/32368* (2013.01); *H04N 1/32598* (2013.01); *H04N 1/32769* (2013.01); *H04N 1/32795* (2013.01); *H04N 2201/0094* (2013.01)
USPC .......................... 358/1.15; 358/1.14; 358/1.13

(58) Field of Classification Search
CPC .......... H04N 1/00217; H04N 1/00798; H04N 1/32368; H04N 1/32598; H04N 1/32769; H04N 1/32795; H04N 2201/0094
USPC ........................ 358/1.15, 1.13, 1.16, 1.14, 1.9
See application file for complete search history.

(56) References Cited

U.S. PATENT DOCUMENTS

| 5,311,327 A * | 5/1994 | Fukushima et al. ........... 358/444 |
| 5,499,108 A * | 3/1996 | Cotte et al. .................... 358/400 |
| 5,889,596 A * | 3/1999 | Yaguchi et al. ............... 358/448 |
| 5,901,278 A * | 5/1999 | Kurihara et al. .............. 358/1.15 |
| 7,215,434 B1* | 5/2007 | Janse et al. .................... 358/1.15 |
| 7,911,638 B2* | 3/2011 | Kashiwagi .................... 358/1.16 |

(Continued)

FOREIGN PATENT DOCUMENTS

| CN | 101031012 A   | 9/2007 |
| JP | 09-046490 A   | 2/1997 |
| JP | 2002-223338 A | 8/2002 |

OTHER PUBLICATIONS

Office Action issued in Chinese Patent Application No. 20111045259207 dated Mar. 5, 2014. English translation provided.

*Primary Examiner* — Houshang Safaipour
*Assistant Examiner* — Walter Yehl
(74) *Attorney, Agent, or Firm* — Rossi, Kimms & McDowell LLP (57) ABSTRACT

An image reading apparatus in which a session timeout does not take place in a case where user's confirmation is obtained before image data obtained by reading originals is transmitted. Before transmission of image data, a control unit determines whether a protocol having a time out is selected. If the selected protocol has a timeout, the control unit determines whether a memory is in a memory full state each time image data of one page is stored into the memory. If the memory is in a memory full state, the user is requested to confirm as to whether transmission is to be performed. If the necessity of transmission is confirmed by the user, the control unit establishes a session with a destination and transmits image data of pages stored in the memory to the destination.

10 Claims, 8 Drawing Sheets

(56) References Cited

U.S. PATENT DOCUMENTS

| | | | |
|---|---|---|---|
| 2002/0024685 A1* | 2/2002 | Sasaki et al. | 358/402 |
| 2002/0114021 A1* | 8/2002 | Lavender et al. | 358/474 |
| 2002/0131089 A1* | 9/2002 | Tanimoto | 358/402 |
| 2003/0035142 A1* | 2/2003 | Kizaki | 358/1.16 |
| 2003/0046368 A1* | 3/2003 | Tanimoto | 709/219 |
| 2003/0214684 A1* | 11/2003 | Kuboki | 358/474 |
| 2004/0133857 A1* | 7/2004 | Wu et al. | 715/527 |
| 2004/0150854 A1* | 8/2004 | Sprague et al. | 358/1.15 |
| 2004/0165207 A1* | 8/2004 | Kashiwagi | 358/1.13 |
| 2005/0057780 A1* | 3/2005 | Fujita et al. | 358/400 |
| 2005/0105145 A1* | 5/2005 | Yoo et al. | 358/498 |
| 2005/0174606 A1* | 8/2005 | Matsueda et al. | 358/402 |
| 2006/0109498 A1* | 5/2006 | Ferlitsch | 358/1.15 |
| 2006/0268362 A1* | 11/2006 | Bridges et al. | 358/450 |
| 2006/0290998 A1* | 12/2006 | Jung et al. | 358/426.03 |
| 2007/0086062 A1* | 4/2007 | Song | 358/401 |
| 2007/0188772 A1* | 8/2007 | Davis et al. | 358/1.1 |
| 2007/0206230 A1 | 9/2007 | Nishio et al. | |
| 2007/0229926 A1* | 10/2007 | Morisaki et al. | 358/527 |
| 2008/0043293 A1* | 2/2008 | Sasaki et al. | 358/474 |
| 2008/0055659 A1* | 3/2008 | Uchida et al. | 358/400 |
| 2008/0079985 A1* | 4/2008 | Ferlitsch | 358/1.15 |
| 2008/0180718 A1* | 7/2008 | Yamashita | 358/1.15 |
| 2009/0116052 A1* | 5/2009 | Matsuzawa | 358/1.14 |
| 2009/0310194 A1* | 12/2009 | Shimizu et al. | 358/498 |
| 2010/0014112 A1* | 1/2010 | Yoshida | 358/1.15 |
| 2010/0103472 A1* | 4/2010 | Kim | 358/402 |
| 2010/0220357 A1* | 9/2010 | Iwadate | 358/1.15 |
| 2010/0231982 A1* | 9/2010 | Mihira | 358/402 |
| 2010/0245932 A1* | 9/2010 | Shimada | 358/442 |
| 2010/0259799 A1* | 10/2010 | Shibao | 358/448 |
| 2011/0128565 A1* | 6/2011 | Shimada | 358/1.13 |
| 2011/0243594 A1* | 10/2011 | Saito | 399/70 |
| 2012/0162712 A1* | 6/2012 | Shibao | 358/1.15 |
| 2012/0176637 A1* | 7/2012 | Miyahara | 358/1.13 |

* cited by examiner

```
                                              700
TRANSMISSION START:  START KEY
              DESTINATION NUMBER:  1
✉ =abc.co.jp
READING SIZE:  A4
COLOR MODE:  COLOR
```

FIG. 7B

```
                                              701
TRANSMISSION START:  START KEY
              DESTINATION NUMBER:  1
✉ =abc.co.jp
COLOR MODE:  COLOR
FILE FORMAT:  PDF
                                              702
```

FIG. 7C

```
                                              704
TRANSMISSION IS IN PROGRESS       705
<CANCEL>
DESTINATION NUMBER:  1
TRANSMISSION PAGE NUMBER:  1
```

FIG. 7D

```
                                              709
TO BE CANCELED?
<NO>
<YES>
```

IMAGE READING APPARATUS HAVING TRANSMISSION FUNCTION AND CONTROL METHOD THEREFOR

BACKGROUND OF THE INVENTION

1. Field of the Invention

The present invention relates to an image reading apparatus having a transmission function and a control method therefor.

2. Description of the Related Art

An image forming apparatus such as an MFP (multi function peripheral) is generally provided with an image reading apparatus for reading originals. In recent years, even a low-priced image reading apparatus has a transmission function for converting read original image data into a file format specified by a user and transmitting the resultant data to a specified destination according to a predetermined protocol.

For image data transmission by the transmission function, accumulation type transmission, successive type transmission, or the like is used.

The accumulation type transmission refers to a technique of reading all originals to be transmitted, temporarily storing image data into a storage of an MFP, and transmitting the image data stored in the storage.

Although the accumulation type transmission requires a large-capacity storage capable of storing a large amount of image data, it can transmit the same image data any number of times so long as the image data is not erased from the storage. It is therefore possible to transmit the image data simultaneously to different destinations.

In the accumulation type transmission, the original image data is retained in the storage, and therefore so-called simultaneous transmission can be achieved even in the case of using a transmission protocol requiring that different pieces of header information be added to respective ones of image data for different destinations.

In the accumulation type transmission, image data to be transmitted is stored in the storage, as previously described. Thus, a recovery process can be carried out in a case, for example, that transmission of image data has failed. Furthermore, since all originals are read before start of transmission of image data, a user can leave the image reading apparatus immediately after the originals are read and before completion of processing for the transmission.

The successive type transmission refers to a technique of transmitting image data of original each time one sheet of original is read. In the successive type transmission, the transmitted image data is immediately erased from the storage.

The successive type transmission is functionally inferior to the accumulation type transmission since the above-described advantageous operations of the accumulation type transmission are restricted in the successive type transmission. With the successive type transmission, however, transmission can be carried out provided that the storage has a capacity corresponding to at least image data of one sheet of original.

Even in a low-priced image reading apparatus, high user-friendliness is requested. For example, the provision of the following functions is demanded.

(1) Function of reconfirming a user's intention when the user performs an operation to cancel a transmission job which is in execution, thereby reducing an operation mistake.

(2) Function capable of executing, as one job, processing for transmission of image data of plural sheets of originals even in a reading mode in which each time an original placed on an original platen (original placement table) has been read, an inquiry is made to the user about whether the next original is to be read and in which if the original placed on the original platen is replaced by the next original, the next original is read.

Japanese Laid-open Patent Publication No. H9-046490 discloses an image forming apparatus that enables a user to confirm a recovery operation, which is performed when a jam takes place in an ADF (auto document feeder). Japanese Laid-open Patent Publication No. 2002-223338 discloses an image reading apparatus capable of continuously and alternately performing reading in a mode in which an original placed by a user on an original table is read and reading in a mode in which an original fed from the ADF onto the original table is read. This image reading apparatus performs control to change the reading mode at a specified page to another reading mode, if an interruption instruction is given when reading is being performed in either one of the reading modes. After completion of the reading in the reading mode after the mode change, it is determined whether there is an original which is the same type as the originals read in the previous reading mode. If there is such an original, the previous reading mode is resumed.

For a low-priced image reading apparatus, successive type transmission capable of suppressing the storage capacity as compared to accumulation type transmission is sometimes used.

Even in a low-priced image reading apparatus, various processing for transmission of image data obtained by reading plural sheets of originals are sometimes handled as one job, while making an inquiry to a user about whether the next original is to be read each time an original has been read. This is a case, for example, where after one sheet of original placed on the original platen of the image reading apparatus is read, a user replaces the original by the next original and gives an instruction to read the next original. In that case, the image reading apparatus waits for a user's instruction after reading one sheet of original. In the successive type transmission, a session with a transmission destination apparatus is established at a timing to transmit image data obtained by reading the first one of originals. If a predetermined time period has elapsed while the image reading apparatus is waiting for a user's instruction, a session timeout takes place depending on a transmission protocol selected at the time of transmission, so that a job which is being processed is discontinued.

In an image reading apparatus that employs the successive type transmission, an instruction to cancel a job is sometimes given by a user while an original is being read or image data is being transmitted. In such a case, the image reading apparatus does not immediately cancel the job which is in execution, but cancels the job after an instruction to confirm that the job is to be canceled is given by the user. In other words, the image reading apparatus waits for the user's job cancellation confirmation instruction after receiving the user's job cancellation instruction. Depending on the transmission protocol, there is a case where a session timeout takes place while the image reading apparatus is waiting for the job cancellation confirmation instruction, so that the job is discontinued.

SUMMARY OF THE INVENTION

The present invention provides an image reading apparatus and a control method therefor, in which a session timeout does not take place in a case where user's confirmation is obtained before image data obtained by reading originals is transmitted.

According to one aspect of this invention, there is provided an image reading apparatus that communicates with an external apparatus, which comprises a selection unit configured to select one of transmission protocols, an acceptance unit configured to accept an instruction to transmit image data, a reading unit configured to read originals and generate image data in a case where the acceptance unit accepts the instruction, an inquiry unit configured to inquire a user about whether a subsequent original is to be read or reading is to be completed each time one original is read by the reading unit, a successive type transmission unit configured to transmit to the external apparatus image data generated by the reading unit each time one original is read by the reading unit, an accumulation type transmission unit configured to store image data generated from originals read by the reading unit until a response indicating that reading is to be completed is given in response to an inquiry from the inquiry unit and configured to transmit the stored image data to the external apparatus, and a control unit configured to cause the accumulation type transmission unit to transmit image data generated by the reading unit in a case where the selected protocol is a protocol that has a timeout for a session established between the image reading apparatus and the external apparatus and configured to cause the successive type transmission unit to transmit image data generated by the reading unit in a case where the selected protocol is a protocol that has no timeout for a session established between the image reading apparatus and the external apparatus.

With the present invention, an effect can be achieved that a session timeout does not take place in a case where user's confirmation is obtained before image data obtained by reading originals is transmitted.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
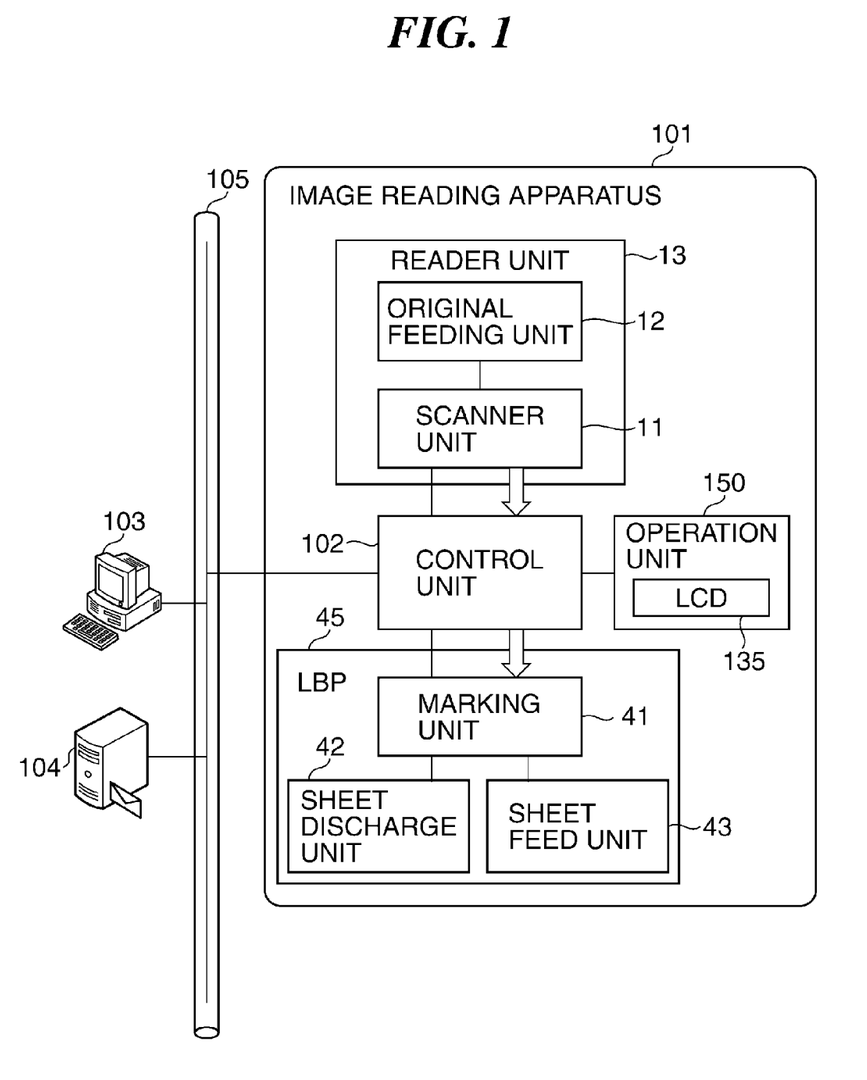
FIG. 1 is a block diagram showing an example of an image reading apparatus according to one embodiment of this invention.

FIG. 1 shows in block diagram an example of an image reading apparatus according to one embodiment of this invention.

Referring to FIG. 1, an image reading apparatus 101 includes a reader unit 13, control unit 102, laser beam printer (LBP) 45, and operation unit 150. The image reading apparatus 101 is connected for communication with a client PC 103 and a mail server 104 through a LAN 105 which is a network.

The reader unit 13 includes a scanner unit 11 for reading an original and an original feeding unit 12 for conveying an original to the scanner unit 11. The scanner unit 11 optically reads an original automatically fed onto an original platen (not shown) from the original feeding unit 12 (hereinafter, also referred to as the ADF) or an original manually placed on the original platen, and outputs an image signal. The image signal is supplied to a control unit 102 by which predetermined image processing is performed on the image signal to obtain image data.

The control unit 102 transmits the image data to the LAN 105 in accordance with a transmission instruction from an operation unit 150, as described later. In other words, the control unit 102 has a transmission function.

To perform printing, the control unit 102 outputs image data to the LBP 45. In accordance with the image data, the LBP 45 prints an image onto a recording sheet and discharges the printed sheet. The LBP 45 includes a marking unit 41, a sheet discharge unit 42, and a sheet feed unit 43 having recording sheet cassettes. In accordance with image data, the marking unit 41 forms an image on a recording sheet fed from the sheet feed unit 43, and fixes the image onto the recording sheet. After being sorted and stapled for example, printed recording sheets are output from the sheet discharge unit 42.

As described above, the control unit 102 has a copy function for controlling the reader unit 13 to read an original image and for controlling the LBP 45 to perform image formation based on image data, and has a transmission function for transmitting image data, which is obtained by the reading performed by the reader unit 13, to the client PC 103 or the like through the LAN 105.

It should be noted that in the case of image data transmission in the form of e-mail, image data is transmitted through the mail server 104 to a destination such as the client PC 103.

The operation unit 150 has a liquid crystal display (LCD) and hard keys (described later), and functions as a user I/F (interface) for operating the image reading apparatus 101.

Figure 2:
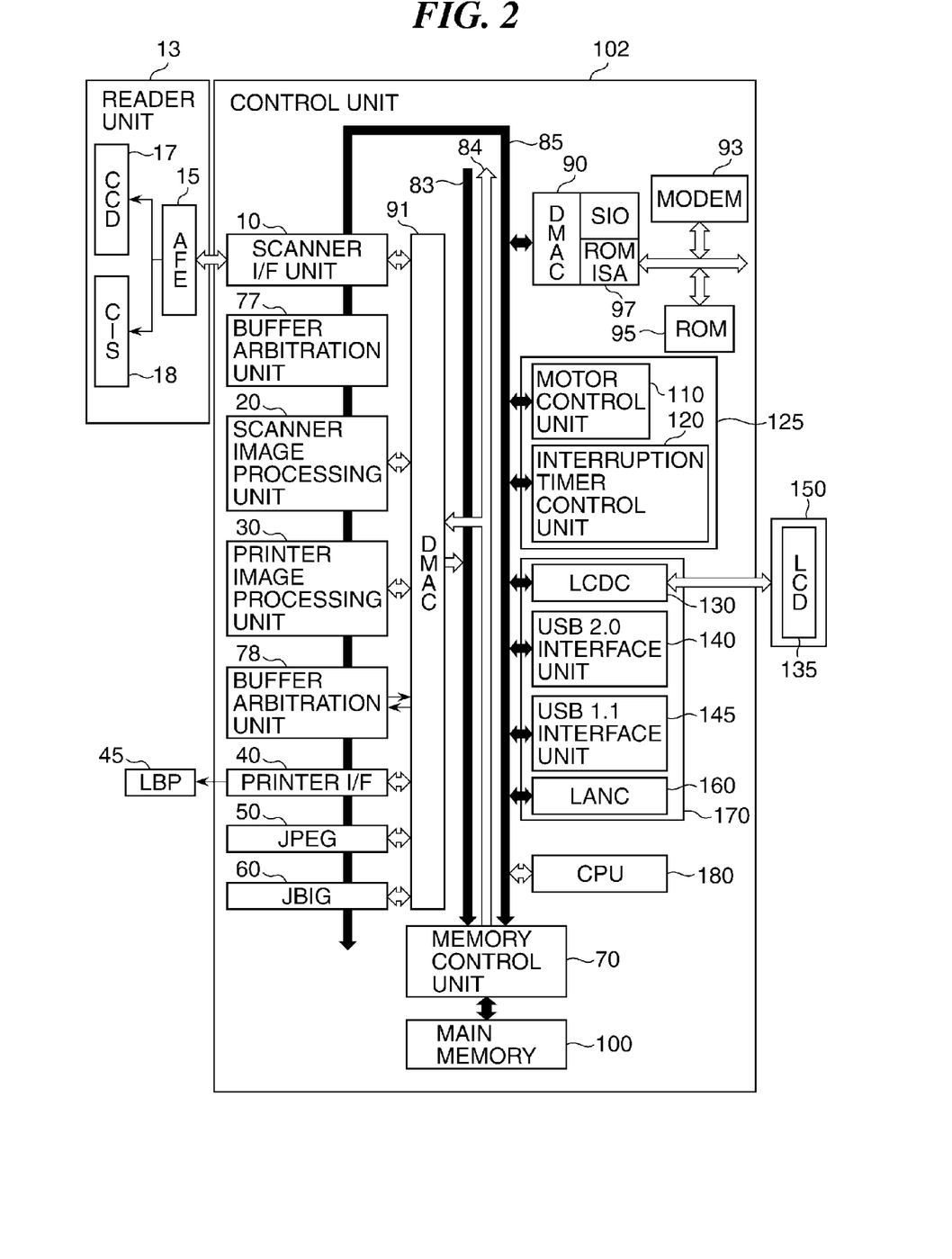
FIG. 2 is a block diagram showing a hardware structure of the image reading apparatus.

FIG. 2 shows in block diagram the construction of the control unit 102 of the image reading apparatus 101.

The control unit 102 includes a scanner I/F unit 10 connected through an analog front end (AFE) 15 with a CCD (solid-state image pickup device) 17 and a CIS (compact image sensor) 18, which are provided in the scanner unit 11 (see FIG. 1) of the reader unit 13. Thus, the control unit 102 can capture read data (image signal) without the intervention of individual dedicated circuits.

The scanner I/F unit 10 is compatible with the CCD 17 and the CIS 18 which are image reading devices, and inputs and processes an image signal output from each of these image reading devices. The image signal received by the scanner I/F unit 10 is DMA (direct memory access) transferred by a memory control unit 70 and developed as image data in a main memory 100.

A scanner image processing unit 20 performs image processing on the image data developed in the main memory 100 according to an image processing operation mode (color copy, monochrome copy, color scan, monochrome scan, or the like).

A buffer arbitration unit 77 arbitrates write/read of image data delivered between the scanner I/F unit 10 and the scanner image processing unit 20 through a ring buffer area of the main memory 100.

A printer image processing unit 30 performs area editing and resolution conversion on image data, and outputs the resultant image data to the LBP 45 through a printer I/F 40.

A buffer arbitration unit 78 arbitrates write/read of image data delivered between the printer image processing unit 30 and the printer I/F 40 through the ring buffer area of the main memory 100. The buffer arbitration units 77, 78 are the same in construction as each other but perform control differently from each other.

JPEG modules 50, 60 respectively perform compression and decompression on image data under predetermined standards. The memory control unit 70 is connected to first and second buses 83, 84 of an image processing system of the control apparatus 102 and to a third bus 85 of a computer system of the control apparatus 102, and controls data transfer for data writing and reading to and from the main memory (SDRAM) 100.

A DMA controller (DMAC) 90 is connected to a ROM 95 through a ROM ISA (ISA bus) 97. The DMAC 90 cooperates with the memory control unit 70 to generate and set predetermined address information for use in DMA control for data exchange between the main memory 100 and external devices through an interface unit 170.

A DMA controller (DMAC) 91 cooperates with the memory control unit 70 to generate and set predetermined address information for use in DMA control for data exchange between the main memory 100 and image processing units 10, 20, 30, and 40. For example, in accordance with a type of image reading device (CCD 17 or CIS 18), the DMAC 91 generates, on a per DMA channel basis, address information for use when image data read and processed by the scanner I/F unit 10 is DMA transferred to the main memory 100. The DMAC 91 performs DMA transfer of image data developed in the main memory 100 to the scanner image processing unit 20. As described above, the DMAC 91 cooperates with the memory control unit 70 to perform DMA control between the main memory 100 and the image processing units 10, 20, 30, and 40.

The ROM 95 stores control programs and control parameters for the image reading devices (i.e., the CCD 17 and the CIS 18). Thus, image data compatible with data output formats of the CCD 17 and the CIS 18 can be input and processed, and the provision of dedicated interface circuits is unnecessary. The ROM 95 stores data that is to be retained irrespective of whether the power is on or off. As illustrated, the ROM SIA 97 is also connected to a modem 93.

The first bus 83 is a bus through which image data read from the main memory 100 is transferred to image processing units 10 to 60 of the image processing system. The second bus 84 is a bus through which image data is transferred from the image processing units 10 to 60 to the main memory 100. The first and second buses 83, 84 are paired to transfer image data between the image processing units 10 to 60 and the main memory 100. The third bus 85 is connected with a CPU 180, interface unit 170, mechatronic system control unit 125, control registers of the image processing units 10 to 60, and DMAC 90.

The mechatronic system control unit 125 includes a motor control unit 110 and an interruption timer control unit 120 that controls a motor driving timing and also controls timing synchronization between various processing performed by the image processing system.

The interface unit 170 includes an LCDC 130, USB 2.0 interface unit 140, USB 1.1 interface unit 145, and LANC 160.

The LCDC 130 is a unit that controls the LCD 135 to display various settings, processing status, etc. of an image processing apparatus (e.g., image forming apparatus). The USB interface units 140 and 145 are each connected with a peripheral device such as external HDD, external SSD, or USB memory.

The LANC 160 is a unit that controls timings of, e.g., sending image data to connected devices (i.e., timings of accessing the connected devices). The LANC 160 is also used to communicate with the client PC 103 (FIG. 1) or the like through the LAN 105 (FIG. 1). The CPU 180 controls operation of the image reading apparatus 101.

In the following, scan image accumulation processing performed by the image reading apparatus 101 will be described.

Figure 3:
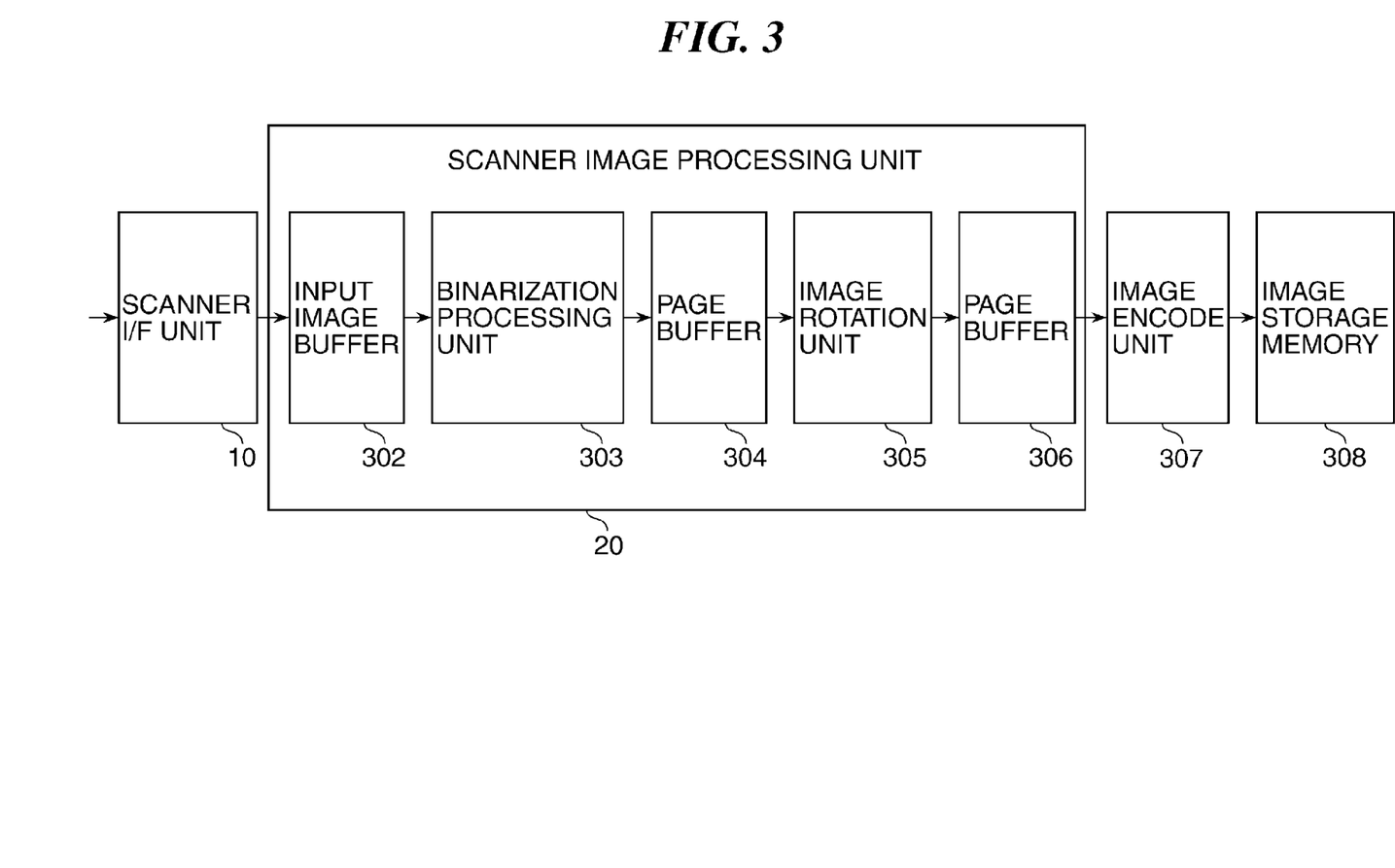
FIG. 3 is a block diagram showing a scan image accumulation processing system of the image reading apparatus.

FIG. 3 shows in block diagram a scan image accumulation processing system of the image reading apparatus 101.

As shown in FIG. 3, the scan image accumulation processing system includes the scanner I/F unit 10, scanner image processing unit 20, image encode unit 307, and image storage memory 308. The image encode unit 307 corresponds to the JPEG module 50 or the JBIG module 60 shown in FIG. 2, and the image storage memory 308 corresponds to the main memory 100 shown in FIG. 2.

Image data supplied from the scanner I/F unit 10 to the scanner image processing unit 20 is temporarily stored in an input image buffer 302 of the scanner image processing unit 20. Each pixel of a monochrome image is represented by, e.g., 1 byte data, and each pixel of color image is represented by, e.g., 3 byte data.

The input image buffer 302 is not required to have a storage capacity to store image data of one page, but only required to have a storage capacity to store image data of the unit of binarization processing performed by a binarization processing unit 303.

The binarization processing unit 303 converts multivalue image data into binary image data on a per predetermined data amount basis, and stores the binary image data into a page buffer 304. An image rotation unit 305 performs rotation processing on the binary image data. Settings for the image rotation unit 305 (e.g., necessity or unnecessity of rotation, rotation direction, and rotation angle) are performed by the CPU 180 (FIG. 2) through the third bus 85 (FIG. 2). The binary image data after rotation processing is stored into a page buffer 306.

The binary image data stored in the page buffer 306 is encode-processed by the image encode unit 307. More specifically, monochrome image data is encoded by the JBIG 60 (FIG. 2), whereas color image data is encoded by the JPEG 50 (FIG. 2). The encoded image data is stored into the image storage memory 308.

As the image storage memory 308, an HDD can be used instead of the main memory 100. Image data is DMA-transferred between the memory or buffer and the image processing units by the memory control unit 70 (FIG. 2) and the DMAC 91 (FIG. 2).

In the following, a description will be given of an example of transmission control performed by the control unit 102 shown in FIG. 2.

The CPU 180 executes a control program stored in the ROM 95 to transmit image data according to predetermined protocol and transmission specifications. More specifically, under the control of the CPU 180, image data stored in the image storage memory 308 (FIG. 3) is encoded, a packet header is added to the encoded image data, and the resultant image data is transmitted to the client PC 103 or the mail server 104 on the LAN 105 through the third bus 85 and the LANC 160.

It is assumed in the illustrated example that the image data is transferred to the client PC 103 through the mail server 104 according to an SMTP protocol (simple mail transfer protocol) on TCP/IP.

Figure 4:
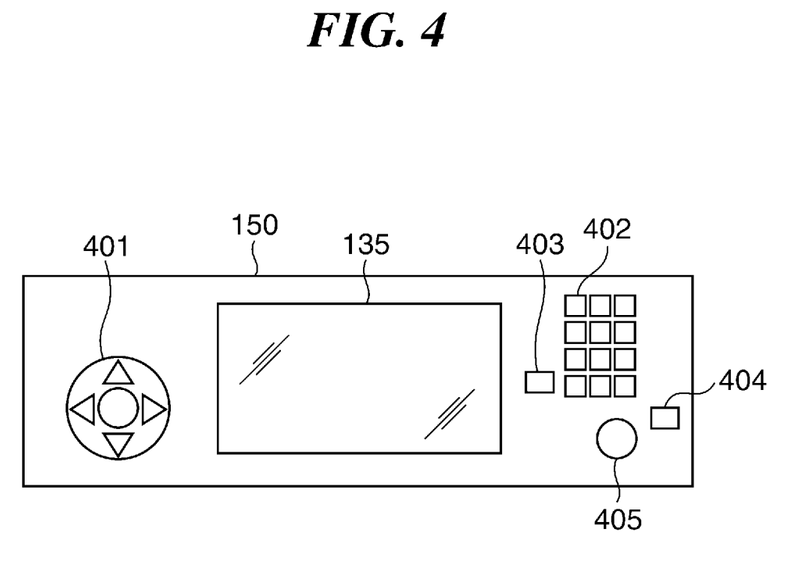
FIG. 4 is a view showing the construction of an operation unit of the image reading apparatus.

FIG. 4 shows the construction of the operation unit 150 shown in FIG. 1.

Referring to FIG. 4, the operation unit 150 includes the LCD 135, as previously described. The operation unit 150 further includes a menu selection key 401, ten keys 402, reset key 403, stop key 404, and start key 405. In the illustrated example, each of these keys 401 to 405 is a hard key.

The LCD 135 performs screen display under the control of the LCDC 130 (FIG. 2). The menu selection key 401 has a cross key for upward, downward, leftward and rightward scrolling a menu displayed on the LCD 135 for selection of an item from the menu, and a confirmation key for confirming the selected item.

The ten keys 402 are used to directly input the number of copies, for example. The reset key 403 is used to clear the settings and restore the settings to initial values. The start key 405 is used to give an instruction to start a job. The stop key 404 is a key used to give an instruction to stop the started job.

Figure 5:
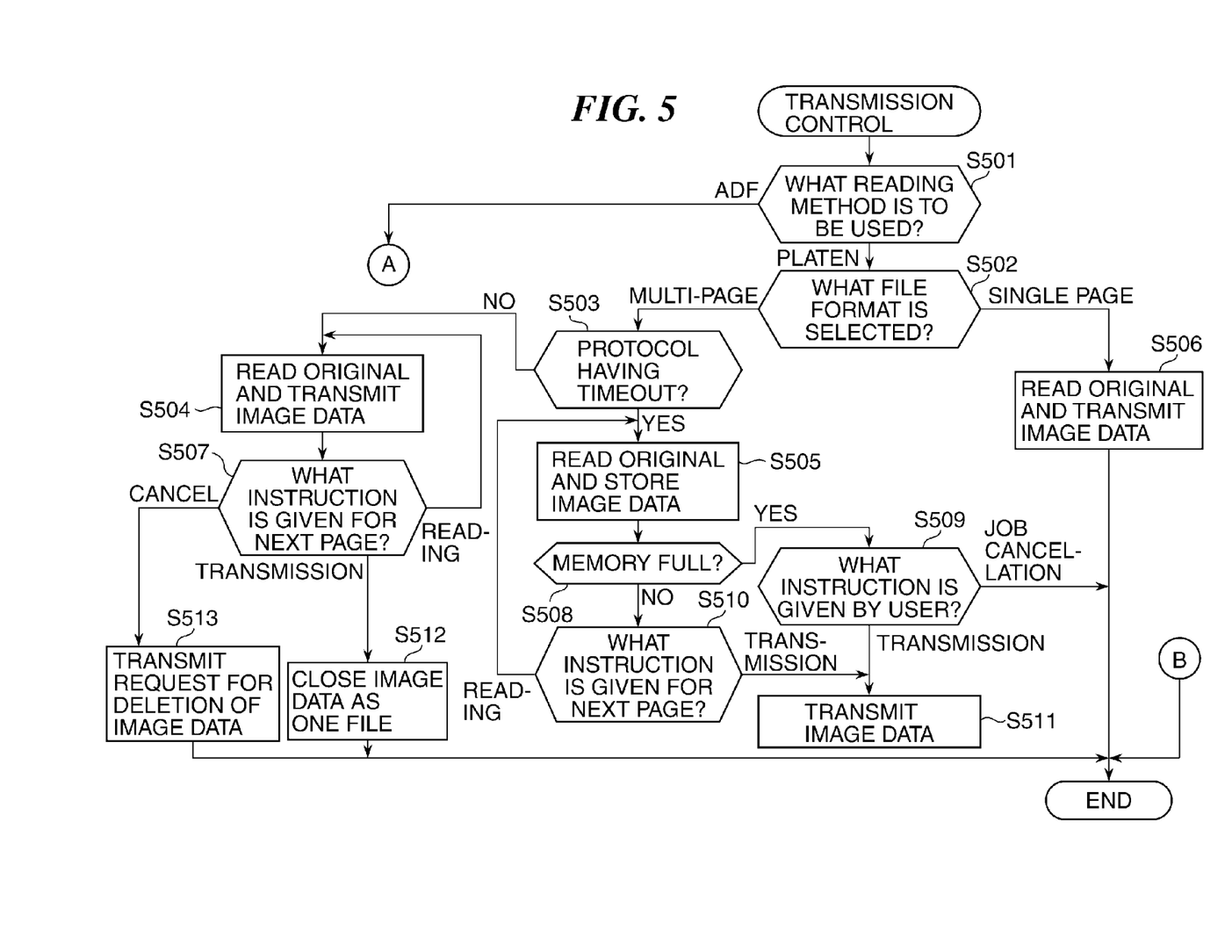
FIGS. 5 and 6 are a flowchart showing image data transmission control performed by the image reading apparatus.
Figure 6:
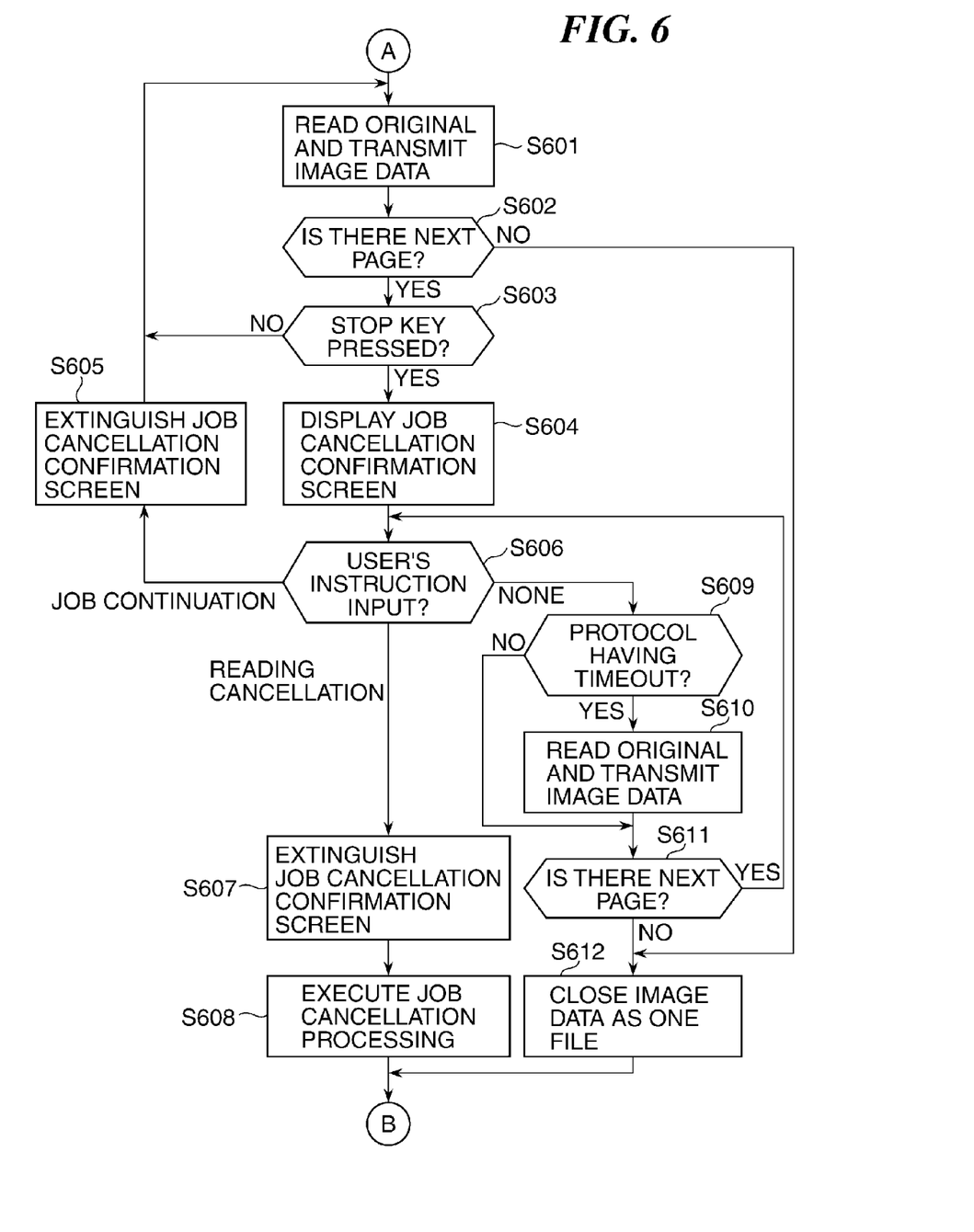

FIGS. 5 and 6 show, in flowchart, image data transmission control performed by the image reading apparatus 101 shown in FIG. 1. The transmission control of FIGS. 5 and 6 is performed by the CPU 180 by reading and executing a program stored in the ROM 95 of the image reading apparatus 101. FIGS. 7A to 7G show UI (user interface) screens displayed on the operation unit 150 at the time of image data transmission.

In the following, a description will be given of an example of a process in which an inquiry is made as to whether the next original is to be read or the reading is to be completed each time one sheet of original (more generally, one original) has been read and in which processing for reading the next original and transmitting image data of the read original is performed, where required, in accordance with a result of the inquiry. More specifically, there will be described a process in which plural sheets of originals are sequentially read while each original is placed on the original platen (original placement table) and replaced with the next original by a user and in which image data of the read originals is transmitted. With this process, even plural sheets of originals (such as a book, notebook, or magazine) that cannot continuously be read by using an auto document feeder (ADF) can continuously be read by the scanner unit 11, while an original placed on the original platen is replaced by the user with the next original and then a reading instruction is given by the user. Thus, processing for transmitting image data obtained from the plural sheets of originals can be performed as one transmission job.

In the following, the term "successive type transmission" will refer to processing where each time each one of plural sheets of originals has been read, image data obtained from the read original is stored into the main memory 100, and the stored image data is transmitted to an external apparatus. The term "accumulation type transmission" will refer to processing where pieces of image data respectively obtained by reading plural sheets of originals are sequentially stored into the main memory 100 (image accumulation memory) and the pieces of image data stored in the main memory 100 are collectively transmitted to an external apparatus after all the originals to be read are read.

Figure 7A:
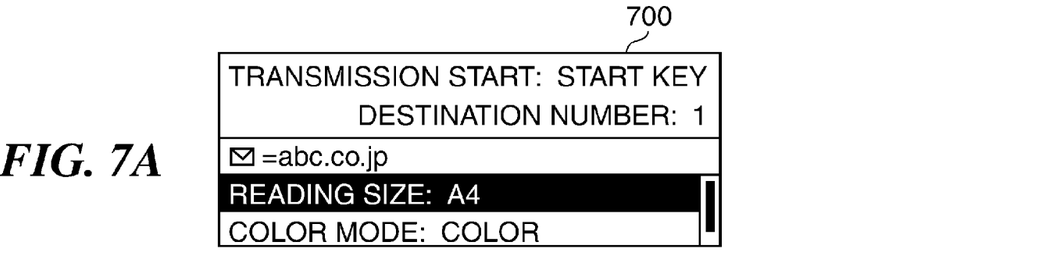
FIG. 7A to 7G are views showing UI screens displayed on the operation unit at the time of image data transmission.

When the operation unit 150 of the image reading apparatus 101 is operated by a user attempting to transmit image data of originals, the CPU 180 of the control unit 102 causes the LCD 135 to display a UI screen 700 shown in FIG. 7A. By using the menu selection key 401, the user specifies a transmission destination, reading size, and color mode on the UI screen 700. Subsequently, when detecting a UI screen scroll instruction given by the user by operating the cross key of the menu selection key 401, the CPU 180 causes the LCD 135 to display a UI screen 701 shown in FIG. 7B. The user specifies a file format 702 on the UI screen 701 by using the menu selection key 401. In this embodiment, the file format 702 can be selected from among PDF, TIFF, and JPEG file formats. It should be noted that in a case where the PDF or TIFF file format is selected as the file format 702, the CPU 180 causes the LCD 135 to display a UI screen (not shown) for selecting either a single page format in which image data obtained by reading one sheet of original (one page) is handled as one file or a multi page format in which pieces of image data obtained by reading plural sheets of originals (plural pages) are handled as one file. On the displayed UI screen, the user specifies the single page format or the multi page format. It should be noted that the single page format or the multi page format can be specified by the image reading apparatus 101 according to a file format or the like, instead of being specified by the user.

Figure 7B:
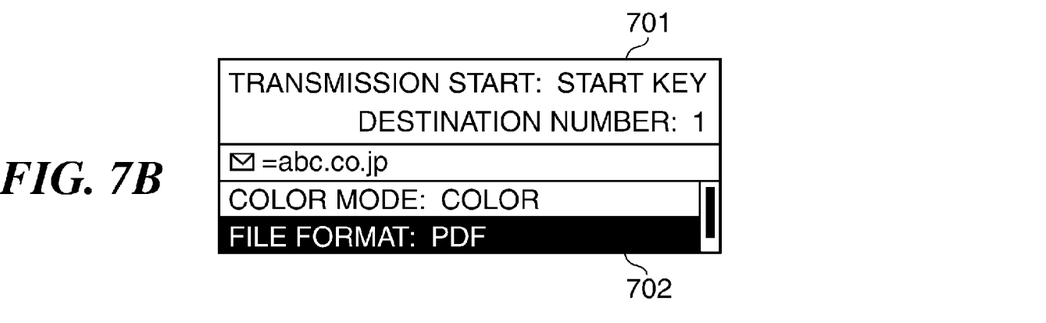
Figure 7C:
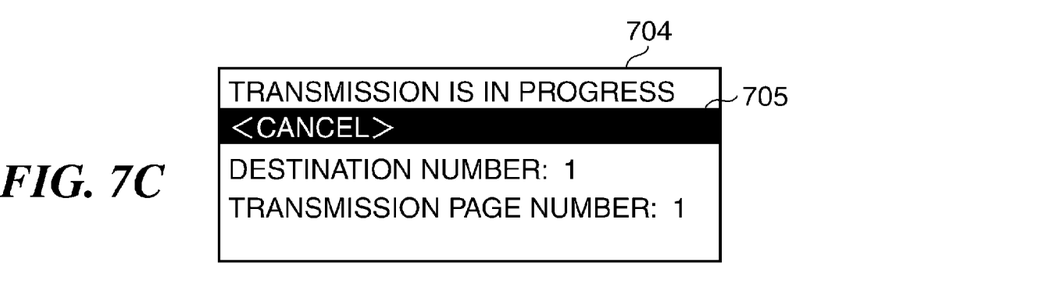

After making the setting of a transmission job as described above, the user presses the start key 405 of the operation unit 150 in a state that the UI screen 700 or 701 is displayed. When detecting that the start key 405 is pressed, the CPU 180 determines that the CPU 180 as an acceptance unit receives an instruction to start reading/transmission processing, and starts transmission control (which is also referred to as the transmission job).

At the start of the transmission job, the CPU 180 determines an original reading method to be used. More specifically, the CPU 180 determines which of the following two methods is to be used (step S501): a method in which an original manually placed on the original platen is read by the scanner unit 11 to obtain image data, or a method in which an original fed onto the platen by the ADF (original feeding unit 12) is read by the scanner unit 11 to obtain image data. The above determination can be made according to a user's instruction input through the operation unit 150 or according to a result of detection in which whether an original to be read is placed on the original platen or on the ADF is detected by an original detection sensor (not shown) or the like.

If it is determined that the method for obtaining image data by reading an original manually placed on the original platen is to be used (i.e., an "platen" branch from step S501), the CPU 180 determines which of two formats (single page format or multi page format) is selected as the file format on the UI screen (step S502). In the present embodiment, this determination is made according to the user's format selection on the UI screen. However, the determination can be made according to the file format 702 shown in FIG. 7B being specified.

If it is determined that the multi page format is selected (i.e., a "multi-page" branch from step S502), the process proceeds to step S503 where the CPU 180 determines whether a transmission protocol to be used in the transmission job is a protocol having a timeout for a session established between the image reading apparatus 101 and a transmission destination apparatus (hereinafter, referred to simply as the protocol having a timeout). As the transmission protocol having a timeout, there can be mentioned, for example, SMTP which is a protocol for e-mail transmission. In the UI screens shown in FIGS. 7A to 7G, there is shown an example where the transmission processing is performed using the e-mail transmission protocol. As another protocol having a timeout, there can be mentioned, for example, SMB (server message block) which is a protocol for file transmission. As a transmission protocol not having a timeout, there can be mentioned a protocol for transmitting image data through a file system to an external memory (e.g., an external storage medium such as an external HDD or SSD, or a USB memory detachably mounted to the image reading apparatus 101). It should be noted that when an instruction to transmit image data is accepted through the operation unit 150, the transmission protocol to be used for the transmission job is selected according to the settings specified by the user or defined by the image reading apparatus 101.

When determining that the transmission protocol is a protocol not having a timeout (i.e., if NO to step S503), the CPU 180 determines that the successive type transmission is to be performed, and transmits a request for establishment of session to an apparatus, which is represented by the destination specified by the user on the UI screen 700. When receiving a session establishment response in reply to the session establishment request, the CPU 180 performs control such that one sheet of original is read, image data obtained by reading the original is stored into the main memory 100, and the image data is transmitted to the destination (step S504). At that time, the CPU 180 causes the LCD 135 to display a UI screen 704 shown in FIG. 7C. On the UI screen 704, a key 705 for selecting "cancel" is displayed and the transmission page number is also displayed.

After completion of transmission of the image data of one page, the CPU 180 causes the LCD 135 to display a confirmation screen 706 (FIG. 7E) for inquiring the user about whether the next original is to be read or the original reading is to be completed (i.e., transmission is to be started) or the transmission job is to be canceled. In a state where the session is kept established, the CPU 180 waits for a user's selection (step S507). The user selects execution of reading the next original or completion of original reading (i.e., start of transmission) or cancellation of the transmission job by operating the menu selection key 401 or the start key 405.

When the start key 405 is pressed on the confirmation screen 706 whereby execution of reading the next original is selected (i.e., a "reading" branch from step S507), the process returns to step S504 where the CPU 180 performs control to read the next original and to store and transmit image data.

It should be noted that in the transmission control of FIG. 5, whether or not the next original is to be read is determined in step S507 after one sheet of original is read and image data is transmitted in step S504. However, if the file format of image data to be transmitted is a TIFF multi-page format, image data is not transmitted in step S504 but retained in the main memory 100. This is because each page of image data in TIFF multi-page format includes pointer information representing the top of image data of the next page, and therefore, in the case of successive type transmission in TIFF multi-page format, image data cannot be generated at least until whether or not there is the next original to be read is confirmed (i.e., whether or not image data of the next page is present is confirmed). For this reason, if the file format of image data to be transmitted is a TIFF multi-page format, image data obtained from the original read in step S504 is not transmitted in step S504 but retained in the main memory 100, as described above. When an instruction to read the next original is given in step S507, pointer information representing the top of image data of the next page is added to the image data retained in the main memory 100, and the resultant image data is transmitted.

When "transmission start" 707 is selected on the confirmation screen 706 (i.e., a "transmission" branch from step S507), the process proceeds to step S512 where the CPU 180 performs processing for closing, as one file, a series of image data transmitted at one time or plural times. At that time, depending on the file structure of the specified file format, data size and data attribute of the file such as the number of pages and color/monochrome designation are transmitted to the transmission destination apparatus. Then, a request for completing the session established with the transmission destination apparatus is transmitted, whereupon the present process is completed.

When "cancel" is selected on the confirmation screen 706 (i.e., a "cancel" branch from step S507), the process proceeds to step S513 where the CPU 180 transmits to the transmission destination apparatus a request for deletion of image data already transmitted in step S504 (step S513), and transmits a request for completing the established session, whereupon the present process is completed.

When determining that the transmission protocol is a protocol having a timeout (i.e., if YES to step S503), the process proceeds to step S505 where the CPU 180 determines that the accumulation type transmission is to be performed, and stores image data of one page obtained by reading the original into the main memory 100 (image accumulation memory).

Each time image data of one page is stored, the CPU 180 determines whether or not a state takes place where image data cannot be stored into a storage area of the main memory 100 (hereinafter, referred to as the memory full state) (step S508). If it is determined that the main memory 100 is not in the memory full state (i.e., if NO to step S508), the process proceeds to step S510 where the CPU 180 causes the LCD 135 to display the confirmation screen 706 shown in FIG. 7E and waits for a user's selection about whether the next original is to be read or original reading is to be completed (i.e., transmission is to be started).

When execution of reading the next original is instructed (i.e., a "reading" branch from step S510), the process returns to step S505 where the CPU 180 performs control to read the next original and to store image data of one sheet of original into the main memory 100.

When "transmission start" 707 is selected on the confirmation screen 706 (i.e., a "transmission" branch from step S510), the CPU 180 transmits a request for establishment of a session with the transmission destination. When receiving a response indicating acceptance of session establishment in reply to the session establishment request, the CPU 180 collectively transmits pieces of image data stored in the main memory 100 (step S511). At that time, the CPU 180 causes the LCD 135 to display a UI screen 710 shown in FIG. 7F, thereby notifying the user that the transmission is in progress. Subsequently, the CPU 180 completes the transmission job.

According to this embodiment, in the case of accumulation type transmission, after the session for image data transmission is established in step S511, there is no step for requesting the user to confirm whether a subsequent original is to be read. Accordingly, a session timeout is not caused due to waiting for a user's instruction.

Figure 7D:
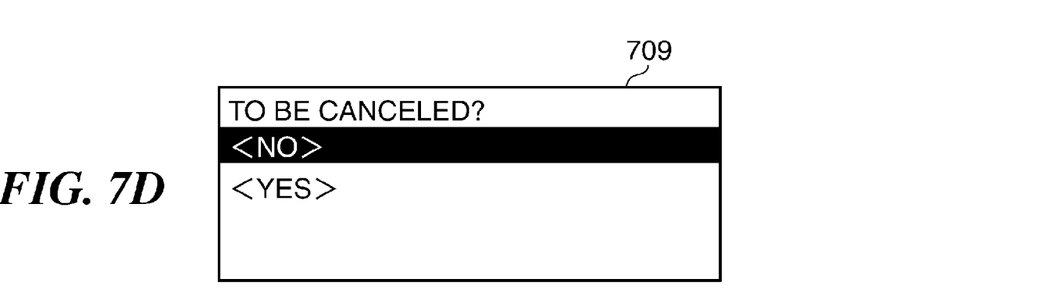
Figure 7E:
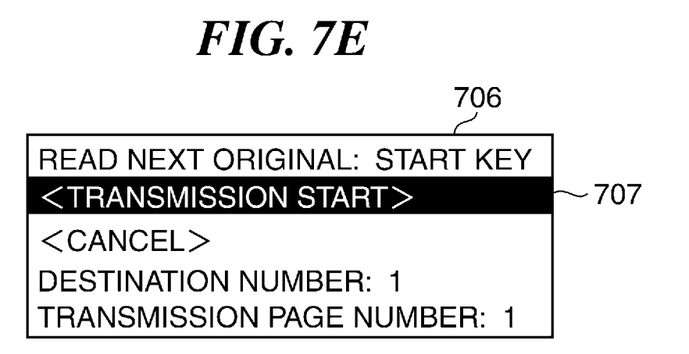
Figure 7F:
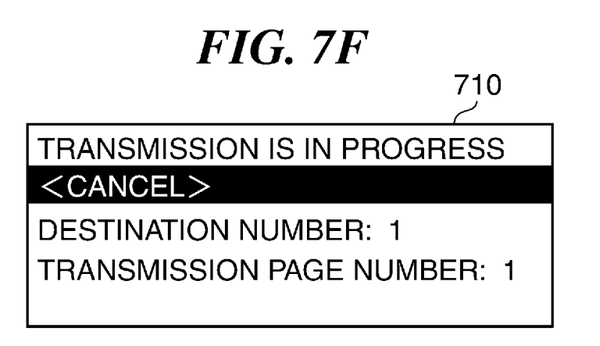
Figure 7G:
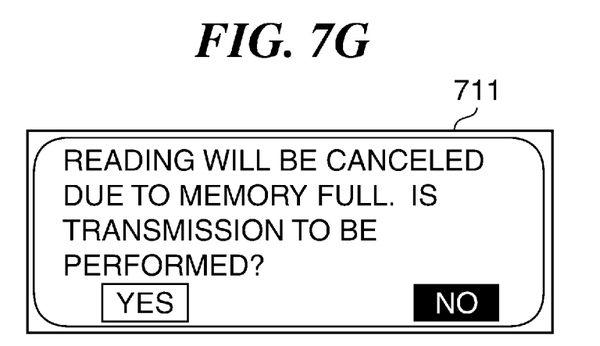

When determining in step S508 that the main memory 100 becomes the memory full state (i.e., if YES to step S508), the CPU 180 causes the LCD 135 to display a confirmation screen 711 shown in FIG. 7G, thereby requesting the user to confirm whether transmission is to be performed, and determines whether or not a user's instruction is given (step S509).

When the user operates the menu selection key 401 to select "YES" on the confirmation screen 711 (i.e., a "transmission" branch from step S509), the process proceeds to step S511 where the CPU 180 establishes a session with the transmission destination and transmits image data accumulated in the main memory 100.

According to this embodiment, even if the main memory 100 becomes the memory full state during execution of the accumulation type transmission, it is possible to transmit image data obtained from originals read until the main memory 100 becomes the memory full state, whereby image data to be transmitted can be prevented from wastefully discarded. If the main memory 100 becomes the memory full state, it is enough to transmit the accumulated image data and then cause the scanner to read only originals which have not yet been read.

When the user operates the menu selection key 401 to select "NO" on the confirmation screen 711 (i.e., a "job cancellation" branch from step S509), the CPU 180 discards (erases) the image data stored in the main memory 100, without transmitting the image data to the transmission destination, whereupon the transmission job is completed.

When determining in step S502 that the selected file format is a single page format, the CPU 180 determines that processing for transmission of image data of one sheet of original is one transmission job. Then, the CPU 180 establishes a session with a destination (transmission destination), reads one sheet of original, stores image data obtained by reading the original into the main memory 100, and transmits the stored image data to the destination (step S506). After completion of the transmission, the CPU 180 completes the transmission job.

When determining in step S501 that the method for reading an original fed by the ADF is to be used as the original reading method (i.e., an "ADF" branch from step S501), the process proceeds to step S601 where the CPU 180 determines that the successive type transmission is to be performed, establishes a session with a destination, controls the scanner unit 11 and the ADF 12 to read one sheet of original, and transmits the resultant image data (step S601). It should be noted that the processing in step S601 is the same as the processing in step S504 except that the original is fed by the ADF 12 onto the original platen instead that the original is manually placed on the original platen.

Next, the CPU 180 determines whether there is the next original (the next page) on the ADF 12 (step S602). If there is no next original (i.e., if NO to step S602), the CPU 180 completes the transmission job.

On the other hand, if there is the next original (i.e., if YES to step S602), the CPU 180 confirms whether the stop key 404 shown in FIG. 4 is pressed (step S603). If the stop key 404 is not pressed (i.e., if NO to step S603), the process returns to step S601 where the CPU 180 performs control to read the next original and to transmit image data.

In this embodiment, whether the stop key 404 is pressed is confirmed in step S603 after image data of one sheet of original is read and transmitted in step S601. However, the processing in step S601 and the processing in step S603 can concurrently be performed, thereby repeatedly determining (monitoring) whether or not the stop key 404 is pressed while the one sheet of original is being read. By doing this, if the stop key 404 is pressed while the one sheet of original is being read, it becomes possible to stop the reading processing which is being performed.

When confirming that the stop key 404 is pressed (i.e., if YES to step S603), the CPU 180 causes the LCD 135 to display a job cancellation confirmation screen 709 shown in FIG. 7D (step S604). The job cancellation confirmation screen 709 is for requesting (inquiring) the user to confirm whether the transmission job is to be canceled. On the screen 709, there are displayed YES and NO buttons.

The CPU 180 determines whether a user's instruction is input (step S606). If the user selects "NO" on the job cancellation confirmation screen 709 by operating the menu selection key 401 (i.e., a "job continuation" branch from step S606), the CPU 180 causes the job cancellation confirmation screen 709 displayed on the LCD 135 to extinguish (step S605). Then, the process returns to step S601 where the CPU 180 restarts the stopped process for reading originals and transmitting image data.

If the user selects "YES" on the job cancellation confirmation screen 709 by using the menu selection key 401 (i.e., a "reading cancellation" branch from step S606), the CPU 180 extinguishes the job cancellation confirmation screen 709 displayed on the LCD 135 (step S607), and executes a transmission job cancellation processing (step S608). More specifically, the CPU 180 transmits a request for deleting the image data already transmitted to the destination in step S601 or in below-described step S610. It should be noted that in the case of executing the transmission using SMTP, which is an e-mail transmission protocol, a request is made to forcibly complete the session established with the mail server, whereby the image data already transmitted to the mail server in step S601 or S610 is determined as being an error and automatically deleted by the mail server.

If it is determined that no user's instruction is input in a state where the job cancellation confirmation screen 709 is displayed (i.e., a "none" branch from step S606), the CPU 180 determines whether the transmission protocol for the transmission job is a protocol having a timeout (step S609). The determination in step S609 is the same as the determination in step S503. It should be noted that before advancing to step S606, the CPU 180 can wait for elapse of a predetermined time period from when the job cancellation confirmation screen 709 is displayed in step S604, while taking account of a time period necessary for the user to input an instruction. Alternatively, the process can advance to step S606 immediately after the job cancellation confirmation screen 709 is displayed. The predetermined time period must be shorter at least than a time period whose expiration causes a session timeout for the transmission protocol.

If it is determined that the transmission protocol is a protocol having a timeout (i.e., if YES to step S609), the CPU 180 perform control to read the next original and transmit image data (step S610). In a case that no user's instruction is given after the stop key 404 is pressed, if the processing for reading and transmission is temporarily stopped, there is a possibility that a session timeout for the transmission protocol (command delivery timeout) occurs. To obviate this, the CPU 180 waits for a user's instruction while continuing the control of reading and transmission, as will be described later.

Next, the CPU 180 determines whether there is the next original (the next page) on the ADF (step S611). If there is no next original (i.e., if NO to step S611), the process proceeds to step S612 in which processing for a case where no user's instruction is given after the stop key 404 is pressed is performed. More specifically, as with step S512, the CPU 180 performs processing for closing the transmitted image data as one file, while determining that the stop key 404 is pressed by erroneous operation (operation mistake).

On the other hand, if it is determined that there is the next original (i.e., if YES to step S611), the process returns to step S606 where the CPU 180 waits for input of a user's instruction.

As described above, in a case that a transmission protocol having a timeout is used, the reading/transmission processing is continued while the job cancellation confirmation screen is being displayed, thereby preventing an occurrence of a timeout for the session established with the transmission destination. It should be noted that in the case of continuing the reading/transmission processing, the transmission job is normally completed when all the plural sheets of originals placed on the ADF are read, if no user's instruction is given after the stop key 404 is pressed whereby the job cancellation confirmation screen 709 is displayed.

If it is determined in step S609 that the transmission protocol is a protocol that has no timeout (i.e., if NO to step S609), the process proceeds to step S611. Even if no user's instruction is input for a long time, a timeout does not take place since the transmission protocol does not have a timeout. Thus, the CPU 180 waits for input of user's instruction, while stopping execution of reading/transmission processing.

As described above, with the image reading apparatus of this embodiment, even if the stop key 404 is pressed while the reading/transmission processing is being performed, the transmission job is not immediately canceled, but subsequently canceled if the instruction to confirm the cancellation of reading is given by pressing the "YES" button. By doing this, even if, for example, the user erroneously presses the stop key 404, it is possible to continue the transmission job (without being canceled) by pressing the "NO" button on the job cancellation confirmation screen 709 to give an instruction to continue the job, whereby usability can be greatly improved.

Furthermore, with the image reading apparatus of this embodiment, control for original reading and image data transmission is changed according to whether the transmission protocol is a protocol having a session timeout, thereby avoiding a transmission protocol dependent problem. More specifically, in the case of successive type transmission, when a request for job cancellation is given by the user while the transmission job is being performed, the user is requested to confirm whether the job is to be cancelled. At that time, if the selected transmission protocol has a session timeout, waiting for reception of a user's instruction is made while the processing for original reading and image data transmission is continued, whereby an occurrence of session timeout can be prevented and the user's intention can be reconfirmed to reduce a user's operation mistake.

With the image reading apparatus of this embodiment, in a case that pieces of image data obtained by reading originals manually placed on the original platen are transmitted by a transmission protocol having a session timeout, control is made to perform the accumulation type transmission. More specifically, processing is performed in which pieces of image data accumulated in the main memory 100 are collectively transmitted in accordance with a user's instruction indicating completion of reading all the originals. In this case, there is a possibility that the main memory 100 becomes the memory full state when a large number of originals are read. If the memory full state occurs, a user's confirmation is obtained as to whether pieces of image data obtained up to now by reading originals should be transmitted. By doing this, even if there is some restriction of hardware resource, it is possible to continuously read originals manually placed on the original platen and to support a multiple-page file format, whereby user-friendliness can be improved.

As apparent from the foregoing description, the CPU 180 and the like, which are shown in FIG. 2, function as a unit for determining whether a protocol has a timeout, a unit for determining whether the main memory 100 is in the memory full state, a confirmation unit, and a unit for performing successive type transmission. The CPU 180 and the like also function as a unit for performing accumulation type transmission, and a unit for determining whether a selected format is a multi page format or a single page format.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-292286, filed Dec. 28, 2010, which is hereby incorporated by reference herein in its entirety.

What is claimed is:

1. An image reading apparatus comprising:
a reading unit configured to read originals for a job including more than one original;
an interface unit configured to transmit data in accordance with a first protocol and a second protocol; and
a transmission control unit configured to control transmission using each of a first type of transmission method and a second type of transmission method, based on protocol information indicating one of the first protocol and the second protocol for transmitting data of the original for the job,
wherein, in the first type of transmission method, data of one original is transmitted by said interface unit in accordance with the first protocol each time the one original is read by said reading unit,
wherein, in the second type of transmission method, data of the originals is transmitted by said interface unit in accordance with the second protocol in response to all of the originals being read by said reading unit,
wherein the first protocol and the second protocol are different protocols.

2. A control method for an image reading apparatus, the image reading apparatus including an interface unit configured to transmit data in accordance with a first protocol and a second protocol, the control method comprising:
a reading step of reading originals for a job including more than one original; and
a transmission control step of controlling transmission using each of a first type of transmission method and a second type of transmission method, based on protocol information indicating one of the first protocol and the second protocol for transmitting data of the original for the job,
wherein, in the first type of transmission method, data of one original is transmitted by said interface unit in accordance with the first protocol each time the one original is read by said reading step,
wherein, in the second type of transmission method, data of the originals is transmitted by said interface unit in accordance with the second protocol in response to all of the originals being read by said reading step,
wherein the first protocol and the second protocol are different protocols.

3. An image reading apparatus comprising:
a reading unit configured to read originals for a job including more than one original;
a USB interface configured to transmit data in accordance with a USB protocol;
a network interface configured to transmit data in accordance with a network protocol; and a transmission control unit configured to control transmission using each of a first type of transmission method and a second type of transmission method, based on protocol information indicating one of the USB protocol and the network protocol for transmitting data of the originals, wherein, in the first type of transmission method, data of one original is transmitted by said USB interface each time the one original is read by said reading unit, wherein, in the second type of transmission method, data of the originals is transmitted by said network interface in response to all of the originals being read by said reading unit.

4. The image reading apparatus according to claim 3, wherein the network protocol is an SMTP protocol or an SMB protocol.

5. The image reading apparatus according to claim 3, wherein said reading unit is configured to read the originals manually placed on an original platen or using an auto document feeder, and wherein, in a case where the originals are read using the auto document feeder, the transmission control unit is configured to control transmission in the first type of transmission method regardless of the protocol information.

6. The image reading apparatus according to claim 3, further comprising a storage unit, wherein said control unit stores the image data in said storage unit until said receiving unit receives the instruction in a case where the image data is to be transmitted in accordance with a network protocol, and wherein said control unit confirms with the user whether the stored image data is to be transmitted in a case where the image data cannot be stored in said storage unit.

7. The image reading apparatus according to claim 3, wherein the input device is configured to input file-format information indicating one of a multi-page format and a single-page format, and wherein the transmission control unit is configured to control transmission in one of a first type of transmission method and a second type of transmission method, based on the protocol information and the file-format information that are input by said input device.

8. The image reading apparatus according to claim 3, wherein said transmission control unit performs processing for closing, as one file, a series of the data transmitted at plural times in a case where the image data is to be transmitted in accordance with USB protocol.

9. The image reading apparatus according to claim 3, wherein the network protocol has a time out for a session established between the image reading apparatus and the external apparatus.

10. A control method for an image reading apparatus, the image reading apparatus including a USB interface configured to transmit data in accordance with a USB protocol and a network interface configured to transmit data in accordance with a network protocol, the control method comprising:

a reading step of reading originals for a job including more than one original;

a transmission control step of controlling transmission using each of a first type of transmission method and a second type of transmission method, based on protocol information indicating one of the USB protocol and the network protocol for transmitting data of the originals, wherein, in the first type of transmission method, data of one original is transmitted by said USB interface each time the one original is read by said reading step, wherein, in the second type of transmission method, data of the originals is transmitted by said network interface in response to all of the originals being read by said reading unit.

* * * * *